United States Patent [19]

Feldmann et al.

[11] Patent Number: 5,575,729
[45] Date of Patent: Nov. 19, 1996

[54] ELASTOMERIC DRIVE BELT CARCASS AND BELT WITH SAME

[75] Inventors: Thomas B. Feldmann, St. Mary's, Ohio; Wesley K. Olson, Monmouth, Ill.

[73] Assignee: The Goodyear Tire & Rubber Company, Akron, Ohio

[21] Appl. No.: 439,327

[22] Filed: May 11, 1995

[51] Int. Cl.⁶ .................................................. F16G 1/08
[52] U.S. Cl. .................................. 474/260; 474/262
[58] Field of Search ............................ 474/260–262, 474/268

[56] References Cited

U.S. PATENT DOCUMENTS

| | | | |
|---|---|---|---|
| 3,485,707 | 12/1969 | Spicer | 474/261 X |
| 3,498,684 | 3/1970 | Hallaman | 474/261 X |
| 3,582,154 | 6/1971 | Russ | 474/261 X |
| 3,820,409 | 6/1974 | Meadows | 474/261 X |
| 3,863,515 | 2/1975 | Meadows | 474/262 |
| 3,941,005 | 3/1976 | Gardiner et al. | 474/262 |
| 4,721,498 | 1/1988 | Grob | 474/261 |
| 5,211,609 | 5/1993 | Haines | 474/260 |

*Primary Examiner*—Roger J. Schoeppel
*Attorney, Agent, or Firm*—Marc R. Dion, Sr.

[57] ABSTRACT

A carcass for an elastomeric drive belt having at least one layer of wire reinforcement made up of two cables spirally wound on each side of a mid-circumferential plane, one in the S direction and the other in the Z direction.

7 Claims, 1 Drawing Sheet

ELASTOMERIC DRIVE BELT CARCASS AND BELT WITH SAME

FIELD OF THE INVENTION

This invention relates to a endless elastomeric drive belt. More particularly, it relates to a drive belt constructed to prevent tracking problems caused by lateral forces generated during the belt's use.

BACKGROUND OF THE INVENTION

U.S. Pat. No. 4,721,498 discloses an endless elastomeric drive belt designed to minimize lateral shifting having a first ply of wire cable reinforcement substantially parallel to the longitudinal direction of the belt, a second ply of wire cable reinforcement laid at a bias angle and a third ply of wire cable reinforcement laid at a bias angle. The angle of the third ply cables is larger than that of the second ply in order that the lateral force components of the outer two plies balance each other when being bent around a wheel. Alternatively, the patent discloses a belt with the two outer plies being laid at equal and opposite bias angles, however, the two plies are constructed differently with the third ply having fewer ends than the second ply either by having smaller cables or a less number of cables, again to balance the lateral forces exerted by the outer two plies. Producing two plies of different construction is inefficient, costly and can lead to difficulties should they be mistakenly interchanged in a manufacturing operation.

U.S. Pat. No. 5,211,609 discloses an endless elastomeric belt designed to minimize lateral shifting, having a spirally wound wire cable reinforcement, a first bias ply of wire reinforcement laid at an angle which has the same direction as the spirally wound first cable and a second bias ply of wire reinforcement laid at an opposite but equal angle to the first bias wire reinforcement. The second bias ply of wire cable reinforcement is spaced at a distance from the first spiral wire cable reinforcement so as to neutralize the lateral forces generated, while in use, of the entire elastomeric drive belt.

SUMMARY OF THE INVENTION

In accordance with the practice of the present invention, there is provided an elastomeric drive belt having a carcass whose construction affords a balance of all the lateral forces exerted thereon which would effect the tracking of the belt.

The carcass for the endless elastomeric drive belt has a mid-circumferential plane and a layer of wire reinforcement made up of two cables spirally wound on each side of the plane, one in the S direction, and the other in the Z direction. The terms S and Z directions refer to right hand and left hand spiralling respectively as is customarily used in the art.

DETAILED DESCRIPTION OF THE INVENTION

The carcass, shown generally at 10, is produced on a cylindrical mandrel (not shown) by applying one or more layers of an elastomeric matrix 13 either directly to the mandrel or onto an impression fabric which has been applied to the mandrel. This is followed by a ply of two spirally wrapped cable reinforcements 12, 14. The two cables 12, 14 are wound and lie in abutting relationship on each side of a mid-circumferential plane 11 such that one lays in the S direction and the other lays in the Z direction. Additional elastomeric matrix 13 is then applied to encapsulate the spiral cables.

Figure 1:
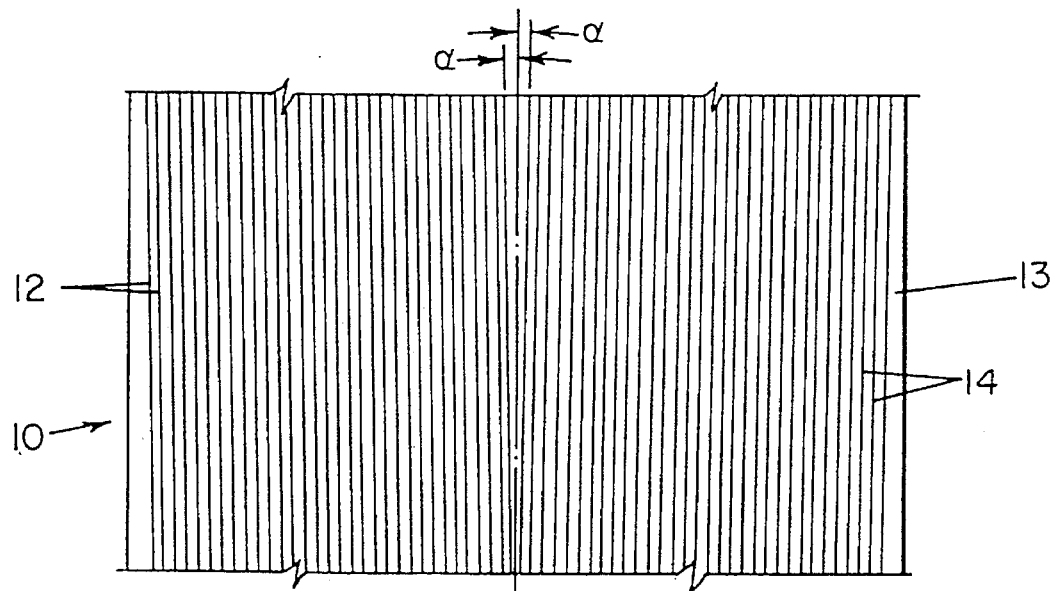
FIG. 1 is a plan view of a portion of the carcass.
Figure 2:
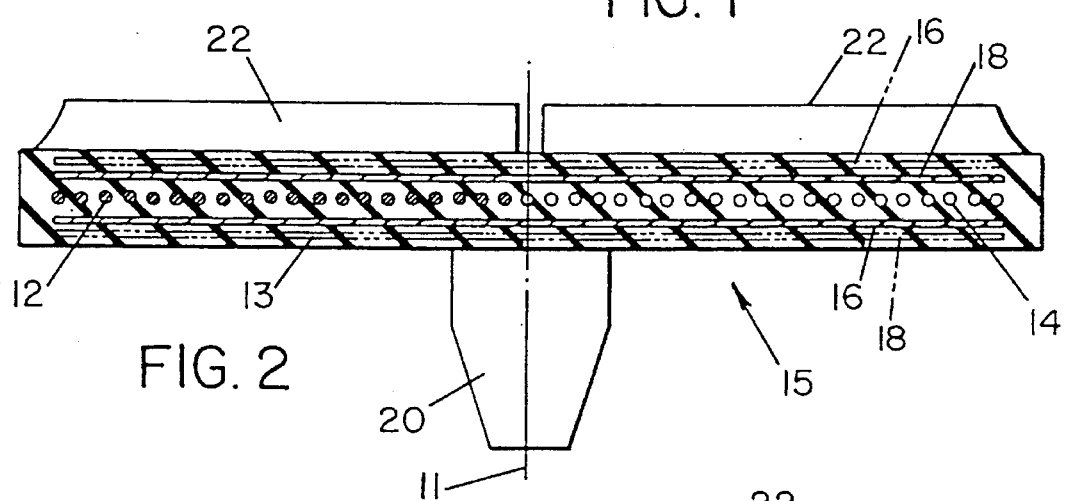
FIG. 2 is a sectional view of an elastomeric drive belt utilizing the carcass of the invention.
Figure 3:
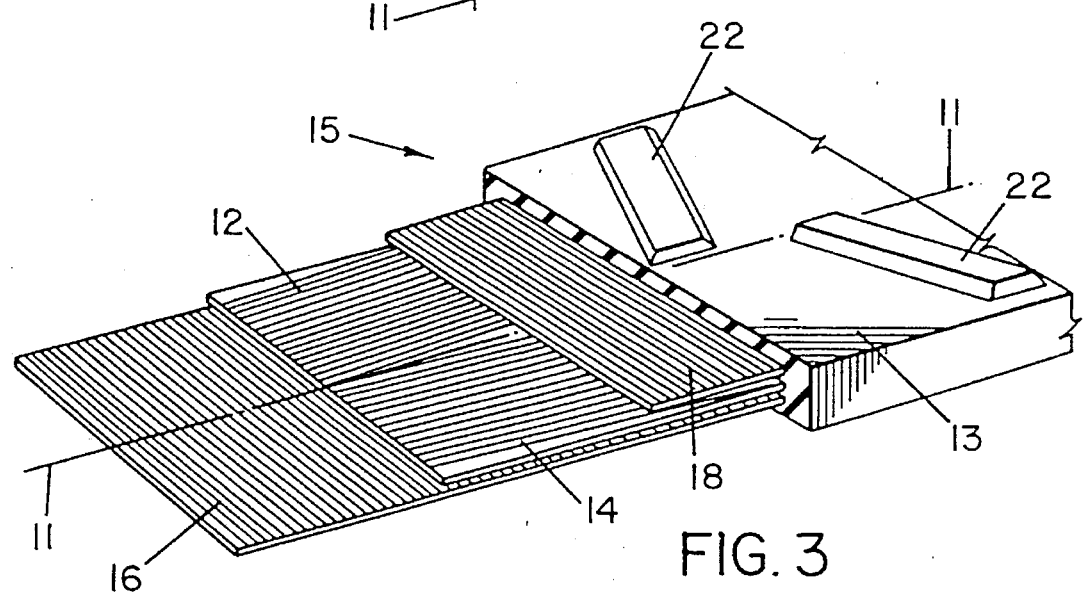
FIG. 3 is a perspective view of the belt with the ply portions broken away in layers.

In order to produce an elastomeric drive belt shown generally at 15, additional layers of wire reinforcement such as 16 can be laid perpendicular to the plane 11. While FIG. 2 illustrates the use of the two layers of perpendicular reinforcement 16, 18 each one on opposite sides of the spiral layer, it can be appreciated that only one of them may be used or both may be placed on the same side of the spiral layer. In order to complete the elastomeric drive belt 15, center guide lugs 20 and cleats 22 are then secured to the opposite sides of the carcass.

The layers of the elastomeric matrix which are used to form the interior or exterior surfaces and to coat the various layers of cable reinforcement as well as to form the cleats 22 and lugs 20 can be any one of the number of natural or synthetic polymers well known in the art and compounded with the usual rubber chemicals to provide adhesion to the cable reinforcement and to vulcanize it into a unitary body.

Depending on the size of the drive belt to be produced and the size of spiral reinforcement cable, it is contemplated that the angle $\alpha$ of the spiral cable reinforcement can range from 0.015° to 0.35°.

While certain representative embodiments and details have been shown for the purpose of illustrating the invention, it will be apparent to those skilled in this art that various changes and modifications may be made therein without departing from the spirit or scope of the invention.

What is claimed is:

1. A carcass for an endless elastomeric drive belt having a mid-circumferential plane comprising a layer of wire reinforcement made up of two cables spirally wound and lie in abutting relationship on each side of said plane, one in the S direction, the other in the Z direction and encapsulated in an elastomeric matrix.

2. The carcass of claim 1 further comprising at least one additional layer of wire reinforcement encapsulated in an elastomeric matrix and laid perpendicular to said plane.

3. The carcass of claim 2 further comprising a second additional layer of wire reinforcement encapsulated in an elastomeric matrix and laid perpendicular to said plane.

4. The carcass of claim 3 wherein each of the two additional layers of wire is laid on opposite sides of the spirally wound cables.

5. The carcass of claim 3 wherein both of the two additional layers of wire are laid on the same side of the spirally wound cables.

6. An elastomeric drive belt having a carcass according to claim 1.

7. A carcass for an endless elastomeric drive belt having a mid-circumferential plane comprising:

a. a first layer of elastomeric matrix;

b. a first layer of wire reinforcement laid on the first layer of elastomeric matrix at 90° to said plane;

c. a second layer of elastomeric matrix laid on the said first wire reinforcement layer;

d. a second layer of wire reinforcement over said second layer of elastomeric matrix made up of two cables which are spirally wound and lie in abutting relationship on each side of said plane to have opposite S and Z hands;

e. a third layer of elastomeric matrix over said second wire reinforcement;

f. a third layer of wire reinforcement laid on said third elastomeric matrix layer at 90° to said plane; and g. a fourth layer of elastomeric matrix.

* * * * *